United States Patent
Kasuga

(10) Patent No.: US 7,339,693 B2
(45) Date of Patent: Mar. 4, 2008

(54) INFORMATION PROCESSING APPARATUS HAVING PRINTER DRIVER AND SHEET PARAMETER SETTING METHOD FOR PRINTER DRIVER

(75) Inventor: Nobuyuki Kasuga, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 935 days.

(21) Appl. No.: 10/614,096

(22) Filed: Jul. 8, 2003

(65) Prior Publication Data

US 2004/0012804 A1    Jan. 22, 2004

(30) Foreign Application Priority Data

Jul. 17, 2002    (JP)    ............................. 2002-208443

(51) Int. Cl.
*G06F 3/12*    (2006.01)
*G06K 15/00*    (2006.01)

(52) U.S. Cl. .................... 358/1.15; 358/1.13; 358/1.16

(58) Field of Classification Search ............... 358/1.15, 358/1.13, 1.14, 1.16, 1.17, 1.18, 1.8, 1.12, 358/1.9, 1.6, 1.2, 1.1, 407, 468, 449, 523; 347/5, 16, 24, 43, 153; 707/1, 3, 8, 10, 104.1; 399/23

See application file for complete search history.

(56) References Cited

U.S. PATENT DOCUMENTS 6,351,320 B1 *    2/2002    Shin ........................... 358/1.9
2003/0206312 A1 *    11/2003    McAfee et al. ............ 358/1.15

FOREIGN PATENT DOCUMENTS

JP    02004034576 A *    2/2004

* cited by examiner

*Primary Examiner*—Dov Popovici
(74) *Attorney, Agent, or Firm*—Fitzpatrick, Cella, Harper & Scinto

(57) ABSTRACT

It is necessary to switch print settings and color processing tables to optimum ones in accordance with a type of sheet which is used in a printer. In the case of enabling a new sheet to be used, a setting can be easily added without newly forming a whole printer driver. Print set information regarding the new sheet is set into a media script and fetched into a media block via a compiler. Control is made so as to store the print set information from a media database API into a media database. When the new sheet is selected on a driver display screen, the media database is searched from the media database API and print data is formed on the basis of the print set information.

6 Claims, 8 Drawing Sheets

FIG. 5

```
media
{
        mediaID = 1234;                              ······S01
        media_string = "plain paper";                ······S02
        paper_source = cassette + manual;            ······S03
        finisher = normal;                           ······S04
        print_qualityA                               ······S05
        {
                resolution = 300;                    ······S06
                halftone_ed                          ······S07
                {
                        color_table = c:¥color100.tbl;  ······S08
                }
                halftone_dither                      ······S09
                {
                        color_table = c:¥color101.tbl;  ······S10
                }
        }
        print_qualityB                               ······S11
        {
                resolution = 300;                    ······S12
                halftone_ed                          ······S13
                {
                        color_table = c:¥color102.tbl;  ······S14
                }
        }
        print_qualityC                               ······S15
        {
                resolution = 600;                    ······S16
                halftone_ed                          ······S17
                {
                        color_table = c:¥color103.tbl;  ······S19
                }
        }
}
```

INFORMATION PROCESSING APPARATUS HAVING PRINTER DRIVER AND SHEET PARAMETER SETTING METHOD FOR PRINTER DRIVER

BACKGROUND OF THE INVENTION

1. Field of the Invention

The invention relates to an information processing apparatus having a printer driver and a sheet parameter setting method for the printer driver and, more particularly, to a method for allowing a printer driver to newly use sheet parameter information adapted to a new media.

2. Related Background Art

Hitherto, there is software called a printer driver which is installed into a computer and converts data that is outputted by application software into a command train that can be interpreted by a printer.

In the case of performing color printing by a printer of an ink jet type, the printer driver needs to switch various parameters such as printing method, resolution, color processing table, and the like in accordance with media (type of paper) as a print target so that an optimum print result can be obtained. For this purpose, a parameter group depending on those media is installed in the printer driver, proper parameters are selected from it in accordance with the media selected by the user, and the printing is executed.

Since the parameter group to be used has previously been installed in the printer driver as mentioned above, in the case of adding a new media, the printer driver itself needs to be updated.

SUMMARY OF THE INVENTION

It is an object of the invention to realize addition, replacement, deletion, or the like of a media without changing a printer driver main body by raising a degree of freedom of handling of a parameter group which depends on the media, that is, by making the parameter group independent of the printer driver main body.

To accomplish the above object, according to the invention, there is provided a printer driver for forming print data to a designated printer in accordance with a request of application software, comprising: holding means which has a structure that can be accessed independently of the printer driver main body and holds print set information according to a type of sheet that is necessary when the print data is formed; obtaining means for, when it receives a print instruction from the application software, obtaining the print set information corresponding to the instructed sheet type from the holding means; and forming means for forming the print data on the basis of the print set information obtained by the obtaining means, wherein the holding means has an input unit for adding and changing the print set information from the outside.

According to the invention, there is provided a sheet parameter setting method comprising: a forming step of forming information regarding a print setting according to a type of sheet which can be used by a printer; a converting step of converting the formed print set information into a format which is used by a printer driver of the printer; a fetching step of fetching the converted print set information into a database in which the print set information of each sheet of the printer driver has been stored; and a forming step of searching the selected print set information of the sheet from the database and forming print data on the basis of the print set information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a diagram showing a media script of a certain media;

DETAILED DESCRIPTION OF THE PREFERRED EMBODIMENTS

First Embodiment

Figure 1:
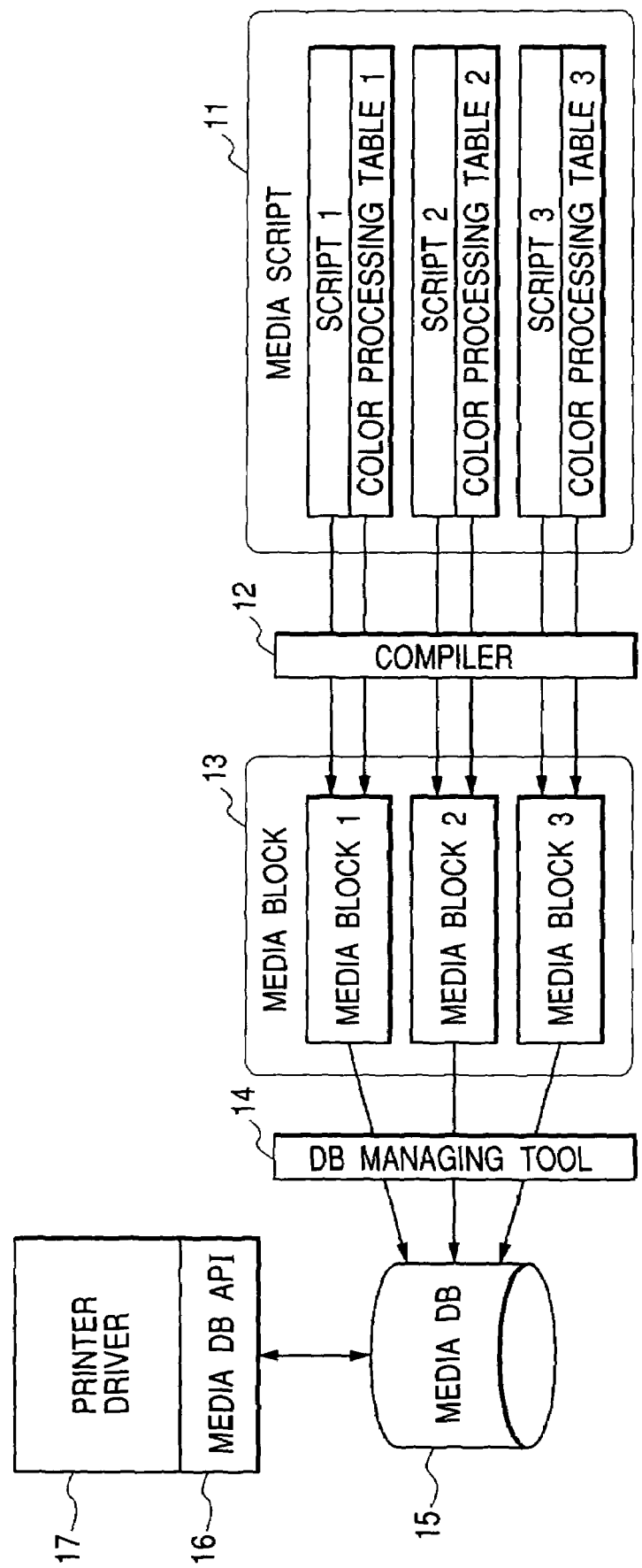
FIG. 1 is a block diagram of a printer driver to which the invention is applied.

FIG. 1 is a diagram most preferably showing a feature of the invention and is a block diagram of a printer driver to which the invention is applied. In the diagram, reference numeral 11 denotes a media script constructed by: a script serving as a text file describing processing parameters corresponding to one certain media (recording sheet); and a color processing table in which data that is used for a color converting process or the like has been stored. One media script 11 is prepared every type of media. Reference numeral 12 denotes a compiler for converting the media script 11 into a media block 13 as binary data; 14 a database managing tool which is used for adding the media block 13 as binary data to a media database (hereinafter, referred to as a media DB) 15 serving as a database main body; and 16 an API (Application Programming Interface) for reading out parameters corresponding to a predetermined media from the media DB 15 by an instruction of a printer driver main body 17. In the ordinary printing operation, the printer driver is constructed by the printer driver 17, the media DB API 16, and the media DB 15.

Figure 2:
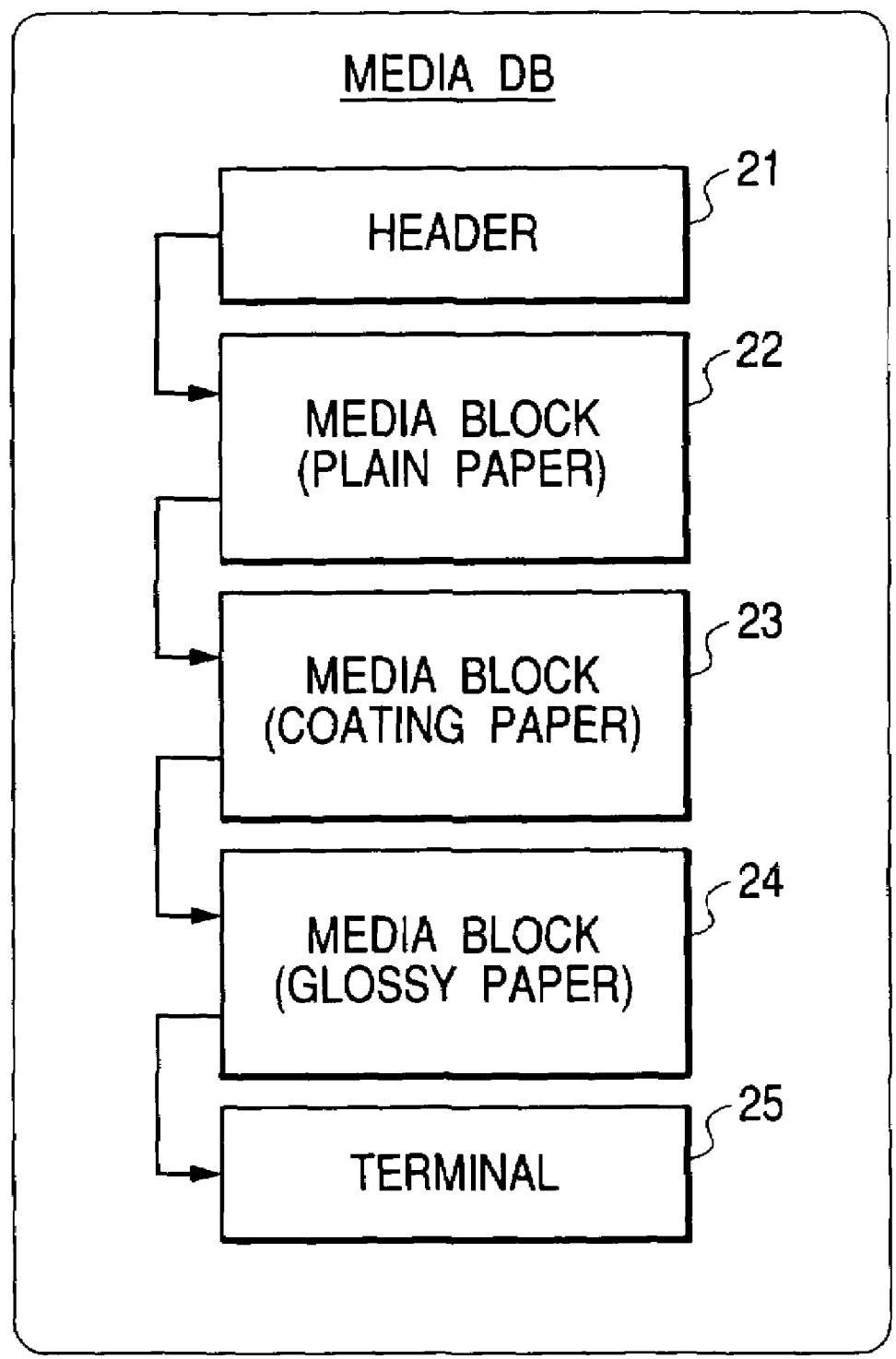
FIG. 2 is a block diagram showing a data structure of a media DB.

FIG. 2 is a block diagram showing a data structure of the media DB 15. Reference numeral 21 denotes a header in which a signature, a date/time, a version, and the like of the media DB 15 have been stored; and 22 to 24 indicate media blocks 13 including the parameters of the media defined in the media DB 15 and they correspond to different types of media, respectively. For example, reference numeral 22 denotes the media block in which information of plain paper has been stored; 23 the media block in which information of coating paper has been stored; 24 the media block in which information of a glossy paper has been stored; and 25 a terminal showing a termination of the media DB 15.

Figure 3:
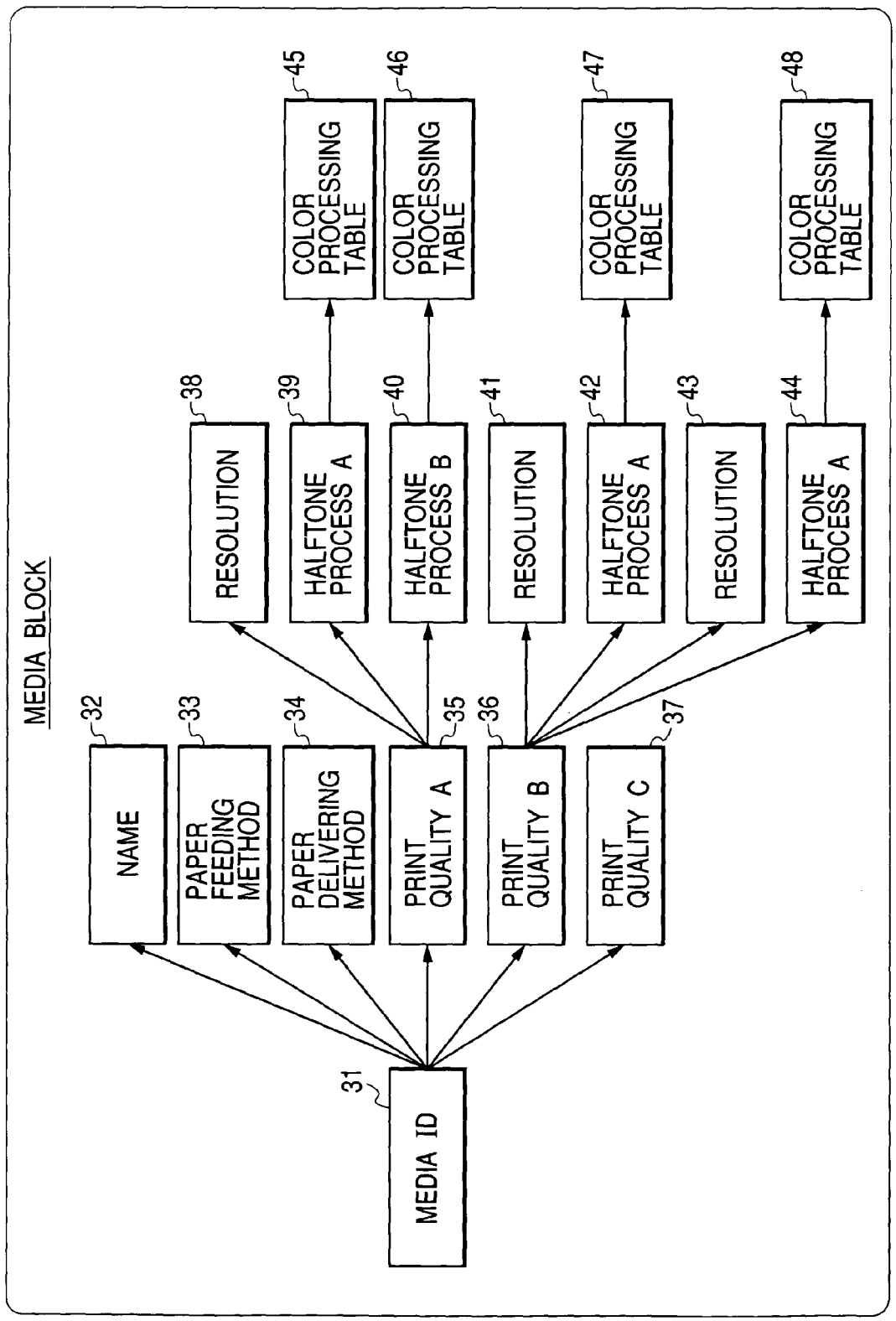
FIG. 3 is a block diagram showing a data structure of a media block.

FIG. 3 is a block diagram showing a data structure of the media block 13. Reference numeral 31 denotes a media ID as ID information allocated every type of media; 32 information of a name (character string) of the media which is used in the user interface of the printer driver; 33 information of a paper feed port through which the media can be fed; 34 information of a paper delivery port through which the media can be delivered; and 35 to 37 parameters of print quality corresponding to the media. In this media, it is shown that three types of print quality A, B, and C can be selected. Reference numeral 38 denotes information of resolution of data which is used in the print quality A35; likewise, 41 and 43 information of resolution of data which is used in the corresponding print quality B36 and C37; and 39 and 40 information regarding halftone processes which are used in the print quality A35. It is shown here that two kinds of halftone processing methods of a halftone process A and a halftone process B can be selected in the print quality A35. Likewise, reference numerals 42 and 44 denote information regarding halftone processing methods which are used at the corresponding print quality, respectively. Reference numeral 45 denotes a color processing table which is used when the print quality A35 and the halftone process A39 are designated. This table includes: a 3-dimensional LUT (Look Up Table) in which data for converting a color space RGB of a computer serving as a host computer into a color space CMY of the printer has been stored; and various tables in which data that is used in color processes such as density adjustment, brightness adjustment, and the like has been stored. Similarly, reference numerals 46, 47, and 48 denote color processing tables which are used when the print quality A and the halftone process B are selected, when the print quality B and the halftone process A are selected, and when the print quality C and the halftone process A are selected, respectively.

Figure 4:
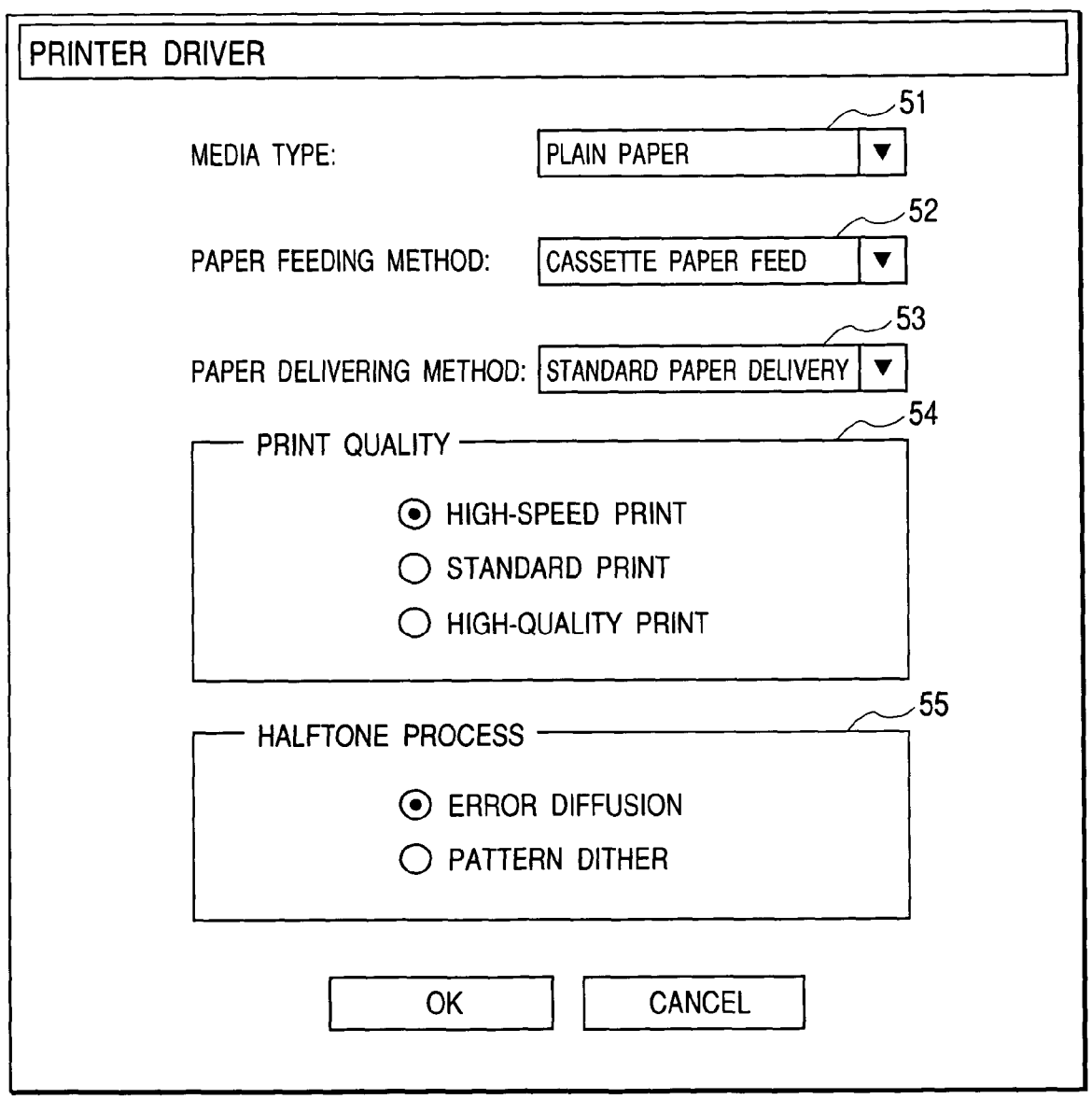
FIG. 4 is a diagram showing a user interface of a printer driver to which the invention is applied.

FIG. 4 is a diagram showing an example of the user interface of the printer driver to which the invention is applied and shows a display example of a print setting display screen of the host computer. Reference numeral 51 denotes a pulldown menu for selecting the media type; 52 a pulldown menu for selecting the paper feeding method; 53 a pulldown menu for selecting the paper delivering method; 54 a column for selecting the print quality. This column has three kinds of selecting items "high-speed print", "standard print", and "high-quality print"; and 55 a column for selecting the halftone processing method. This column has two kinds of selecting items "error diffusion" and "pattern dither".

To set the parameters of the media into the printer driver, first, the media script 11 corresponding to the media to be supported is formed by an external computer or the like. FIG. 5 shows an example of a media script of a certain media (plain paper). S01 denotes a line for designating the media ID 31. S02 denotes a line for designating the character string of the name 32 and "plain paper" is described here. S03 denotes a line for designating the paper feeding method 33 and "cassette paper feed" and "manual paper feed" are described here. S04 denotes a line for designating the paper delivering method and "standard paper delivery" is described here. S05 to S10 designate the parameters shown on the right side from the print quality A35 in FIG. 3. S06 denotes the resolution 38 and 300 dpi is designated here. S07 denotes the halftone process A39 and error diffusion is designated here. S08 denotes the color processing table 45 and a binary file put in a certain location is designated here. In a manner similar to the above, S11 to S14 designate the parameters shown on the right side from the print quality B36 and S15 to S19 designate the parameters shown on the right side from the print quality C37.

As mentioned above, the media script 11 for one certain media is formed and converted into the media block 13 by using the compiler 12. Subsequently, the media block 13 is implemented into the media DB 15 by using the database managing tool 14. By repeating those processes, a plurality of media blocks 13 to be supported are implemented as shown in FIG. 2. In this example, three types of media blocks 13 of "plain paper", "coating paper" and "glossy paper" have been installed.

The compiler 12 and the DB managing tool 14 can be executed by the user or can be also executed from the printer driver.

When the printer driver 17 is activated, it obtains a list of the media IDs 31 of the sheets to be supported by itself from the media DB 15 by using the media DB API 16.

Figure 6:
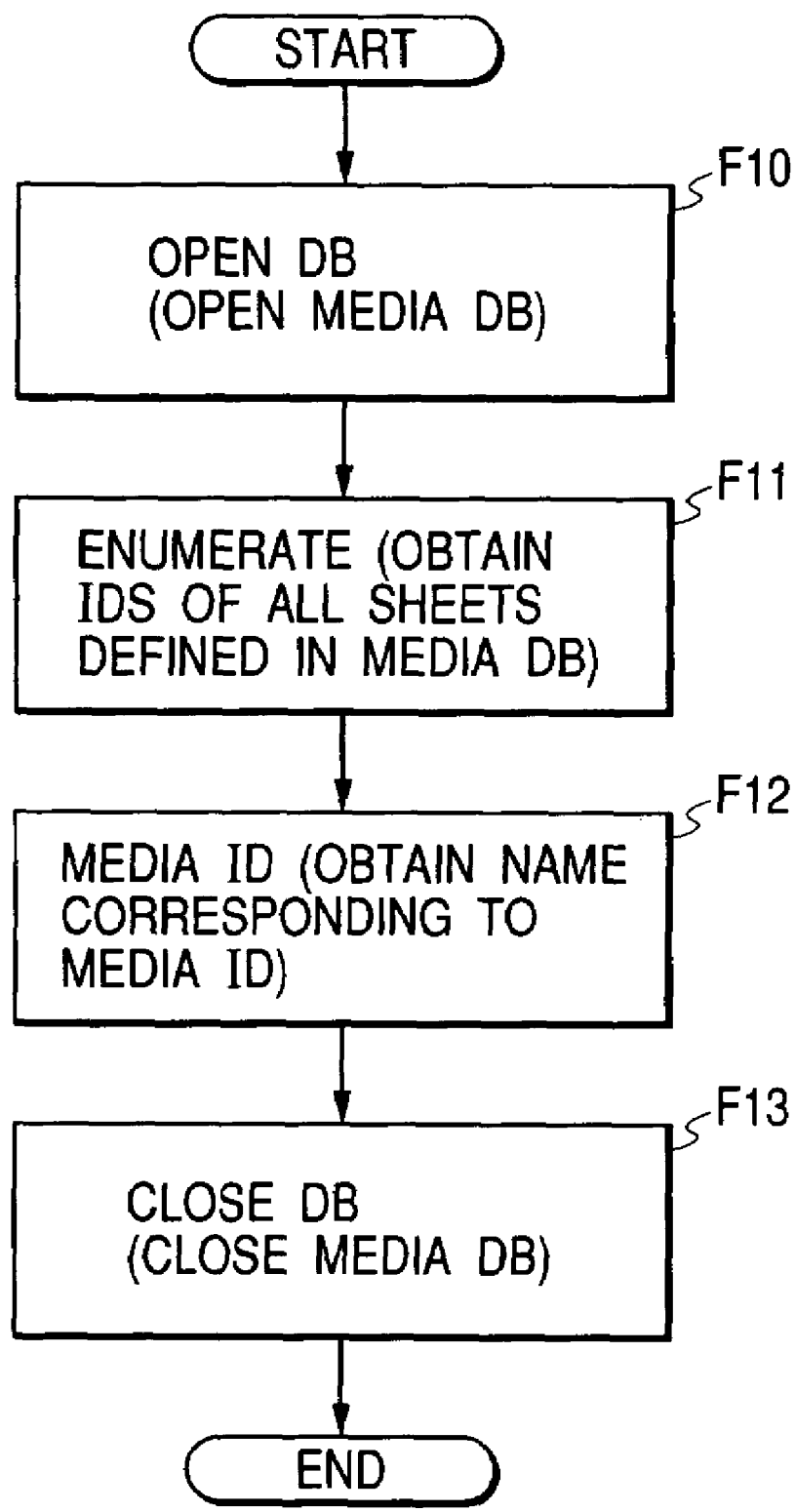
FIG. 6 is a flowchart at the time of obtaining a list of media IDs and a character string of a name.

FIG. 6 is a flowchart for processes of the printer driver 17 which are executed when the list of the media IDs and the character string of the name are obtained. In the diagram, the printer driver 17 opens the media DB 15 as a target via the media DB API 16 in step F10 and searches all of the media IDs 31 registered in the media DB 15 in F11. Subsequently, the character string of the name corresponding to each media ID 31 is obtained in F12. Finally, the media DB 15 is closed and the processing routine is finished. The driver displays the name of the media obtained in this manner into the menu 51 of the media type of the user interface in FIG. 4.

When the user selects an arbitrary media type 51 on the display screen of FIG. 4, the printer driver 17 obtains the parameter group corresponding to the media from the media DB 15 via the media DB API 16.

Figure 7:
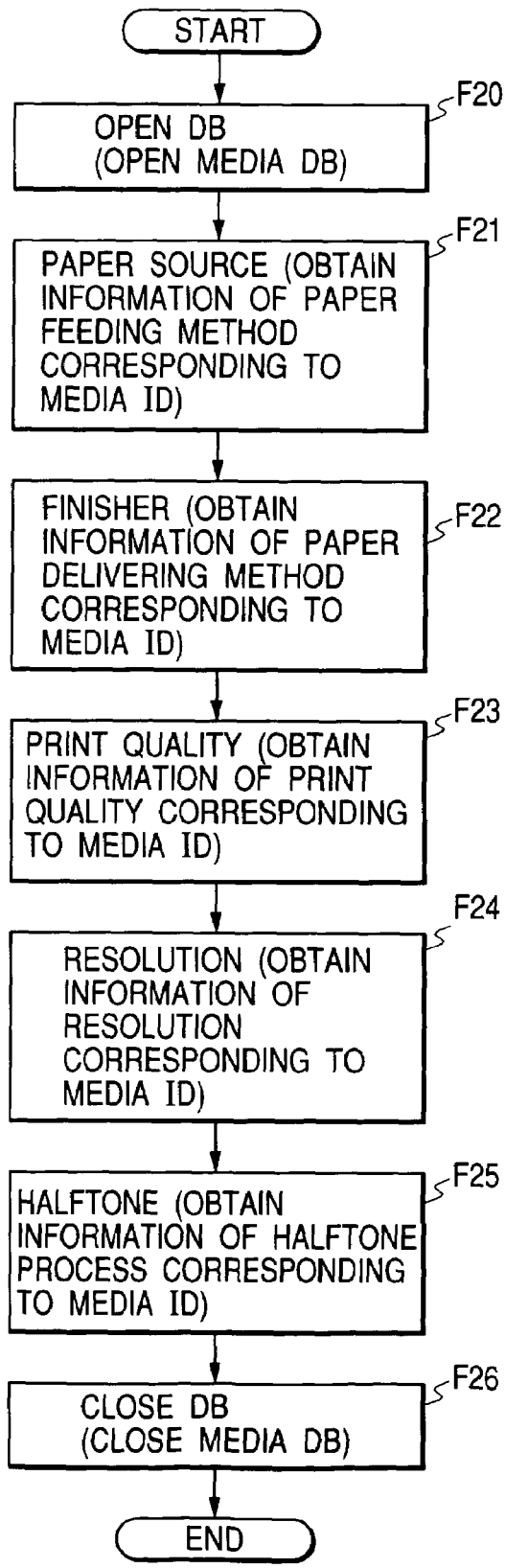
FIG. 7 is a flowchart at the time of obtaining parameters corresponding to a certain media.

FIG. 7 is a flowchart for explaining the operation of the driver at the time of obtaining the parameters corresponding to a certain media. In the flowchart, the driver 17 opens the media DB 15 as a target via the media DB API 16 in F20 and obtains the information of the paper feeding method corresponding to the media ID 31 in F21. Since two parameters "cassette paper feed" and "manual paper feed" have been defined in the media script in FIG. 5, two types of selecting items are displayed onto the paper feeding method menu 52 of the user interface of the driver on the basis of such information. Subsequently, the information of the paper delivering method corresponding to the media ID 31 is obtained in F22. Since only "standard paper feed" has been defined in the media script in FIG. 5, one type of selecting item is displayed onto the paper delivering method menu 53 of the user interface of the driver on the basis of such information. Subsequently, the information of the print quality corresponding to the media ID 31 is obtained in F23. Since three types of parameters "print quality A", "print quality B", and "print quality C" have been defined in the media script in FIG. 5, three types of selecting items "high-speed print", "standard print", and "high-quality print" are validated in the print quality 54 of the user interface of the driver on the basis of such information. Subsequently, the information of the resolution corresponding to the media ID 31 is obtained in F24. Subsequently, the information of the halftone processing method corresponding to the media ID 31 is obtained in F25. Since two types of parameters "error diffusion" and "pattern dither" have been defined in the media script in FIG. 5 with respect to "print quality A", two types of selecting items "error diffusion" and "pattern dither" are validated in the halftone process 55 of the user interface of the driver on the basis of such information. Since only "error diffusion" has been defined for "print quality B", only "error diffusion" is validated in the halftone process 55 of the user interface of the driver. Gray-out of the selecting item "Pattern dither" is performed and this item cannot be selected. Finally, the media DB 15 is closed in F26 and the processing routine is finished. In accordance with the parameter group obtained here, the user interface of FIG. 4 is displayed and the user makes arbitrary print setting to an arbitrary media.

When all print settings are completed and the user starts the printing by clicking an OK button, the printer driver 17 obtains a table necessary when a color process is executed to the print data.

Figure 8:
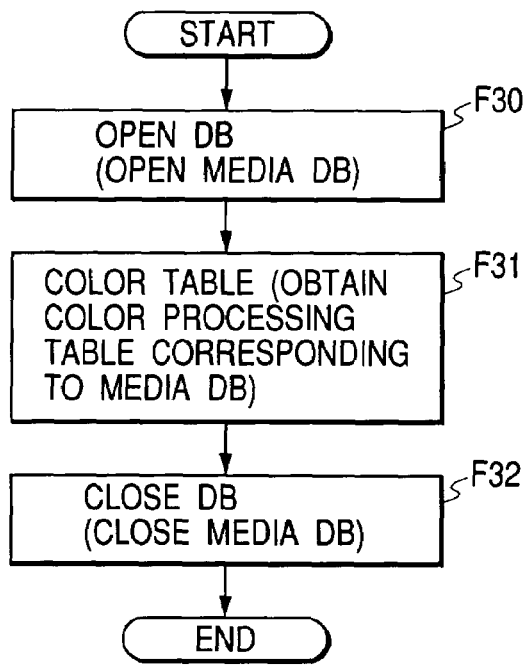
FIG. 8 is a flowchart for explaining the operation for obtaining a color processing table.

FIG. 8 is a flowchart for explaining the operation for obtaining the color processing table by the driver. In the diagram, the driver 17 opens the media DB 15 via the media DB API 16 in F30. Subsequently, in F31, the driver 17 obtains the information of one of the color processing tables 45 to 48 corresponding to the media type designated by the menu 51, the print quality designated by the selection column 54, and the halftone process designated by the selection column 55. Finally, the media DB 15 is closed in F32 and the processing routine is finished.

As described above, the printer driver 17 obtains the various parameters regarding the media from the media DB 15 and executes the printing.

Second Embodiment

Subsequently, an example in the case of adding a media to the media DB 15 or deleting a specific media will be described.

First, as described in the first embodiment, the media script 11 corresponding to the new media to be added is prepared. It is now assumed that "OHP film" is added as a new media. A script and a color processing table regarding "OHP film" are formed by a computer or the like and they are converted into the media block 13 by using the compiler 12.

Figure 9:
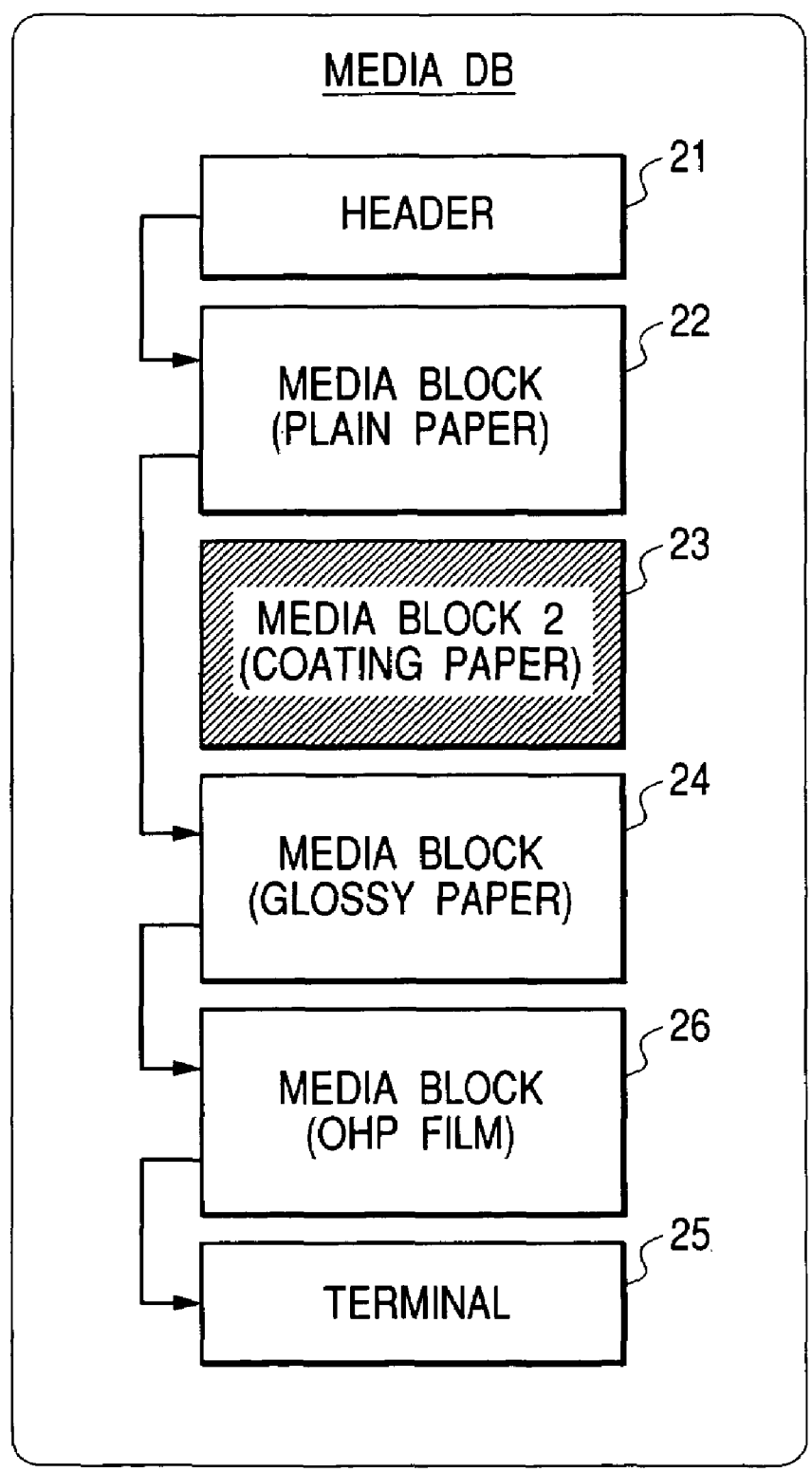
FIG. 9 is a block diagram showing the data structure of the media block at the time of adding and deleting a media.

FIG. 9 is a block diagram showing the data structure of the media DB 15 in the case of adding and deleting a media and shows an example in the case where a media block 26 of "OHP film" is added to and the media block 23 of "coating paper" is deleted from the data structure of the media DB 15 shown in FIG. 2.

The media block 26 of the formed new media is added to the media DB 15 by using the DB managing tool 14. The DB managing tool 14 disconnects a link of a pointer set from the media block 24 of "glossy paper" to the terminal 25 so far and inserts the media block 26 of "OHP film" into such a link. The link of a pointer set from the media block 26 of "OHP film" to the terminal 25 is set. In the case of deleting the media block 23 of "coating paper" as an unnecessary media, a link of a pointer of the media block 22 of "plain paper" so far is disconnected and it is newly connected to a link of a pointer to the media block 24 of "glossy paper".

By executing the above processes, when the printer driver 17 obtains the list of the media IDs 31 included in the media DB 15 next time, three types of media "plain paper", "glossy paper", and "OHP paper" can be obtained. Therefore, the contents of the selecting item 51 of the media type in FIG. 4 can be changed without changing the printer driver 17 at all.

The invention can be applied to a system constructed by a plurality of devices (for example, a host computer, an interface device, a reader, a printer, and the like) or can be also applied to an apparatus (for example, a copying apparatus, a facsimile apparatus, or the like) comprising one device.

The object of the invention is also accomplished by a method whereby a memory medium (or a recording medium) in which program codes of software for realizing the functions of the embodiments mentioned above have been recorded is supplied to a system or an apparatus and a computer (or a CPU or an MPU) of the system or the apparatus reads out and executes the program codes stored in the memory medium.

In this case, the program codes themselves read out from the memory medium realize the functions of the embodiments mentioned above and the program codes themselves and the memory medium in which the program codes have been stored construct the invention.

The invention incorporates not only a case where a computer executes the read-out program codes, so that the functions of the embodiments mentioned above are realized but also a case where an operating system (OS) or the like which is operating on the computer executes a part or all of actual processes on the basis of instructions of the program codes and the functions of the embodiments mentioned above are realized by those processes.

Further, the invention incorporates a case where the program codes read out from the memory medium are written into a memory provided for a function expanding card inserted into a computer or a function expanding unit connected to a computer, thereafter, a CPU or the like provided for the function expanding card or the function expanding unit executes a part or all of actual processes on the basis of instructions of the program codes, and the functions of the embodiments mentioned above are realized by those processes.

As many apparently widely different embodiments of the present invention can be made without departing from the spirit and scope thereof, it is to be understood that the invention is not limited to the specific embodiments thereof except as defined in the appended claims.

As described above, according to the invention, by providing the database for storing the print set information per sheet independent of the printer driver main body; a process such as addition, replacement, deletion, or the like of the sheet which is supported by the printer driver can be freely changed without changing the printer driver itself, so that the work regarding the updating of the driver can be efficiently executed.

What is claimed is:

1. An information processing apparatus having a printer driver for forming print data to a designated printer in accordance with a request of application software, comprising:

holding means which has a structure that can be accessed independently of said printer driver main body and holds print set information according to a type of sheet that is necessary when the print data is formed;

obtaining means for, when it receives a print instruction from said application software, obtaining the print set information corresponding to the instructed sheet type from said holding means; and forming means for forming the print data on the basis of the print set information obtained by said obtaining means, wherein said holding means has an input unit for adding and changing the print set information from an outside.

2. An apparatus according to claim 1, wherein said holding means holds the print set information by an independent data block every sheet.

3. An apparatus according to claim 2, wherein said print set information includes identification information of the sheet and information indicative of optimum print quality setting, halftone processing method, and color processing table.

4. An apparatus according to claim 2, wherein said print set information includes information showing a paper feeding method and a paper delivering method of the sheet.

5. An apparatus according to claim 1, wherein said print set information held in said holding means can be deleted every sheet.

6. A sheet parameter setting method comprising:

a forming step of forming information regarding a print setting according to a type of sheet which can be used by a printer;

a converting step of converting the formed print set information into a format which is used by a printer driver of said printer;

a fetching step of fetching the converted print set information into a database in which the print set information of each sheet of said printer driver has been stored; and a forming step of searching the selected print set information of the sheet from said database and forming print data on the basis of the print set information.

* * * * *